United States Patent
Dollner et al.

(10) Patent No.: US 9,474,408 B2
(45) Date of Patent: Oct. 25, 2016

(54) APPARATUS FOR HEATING AND FROTHING A BEVERAGE PRODUCT

(75) Inventors: Sander Dollner, Ulm-Wiblingen (DE); Alexander Kiefer, Kuchen (DE); Joel Eicke, Ulm (DE); Torsten Boensch, Geislingen/Steige (DE); Peter Arndt, Blaustein (DE); Hans-Ulrich Hostettler, Wichtrach Bern (CH)

(73) Assignee: WMF GROUP GMBH (DE)

( * ) Notice: Subject to any disclaimer, the term of this patent is extended or adjusted under 35 U.S.C. 154(b) by 536 days.

(21) Appl. No.: 13/517,894

(22) Filed: Jun. 14, 2012

(65) Prior Publication Data

US 2013/0145936 A1  Jun. 13, 2013

(30) Foreign Application Priority Data

Jun. 17, 2011 (DE) .................. 10 2011 077 776

(51) Int. Cl.
- A47J 31/44 (2006.01)
- F24D 1/00 (2006.01)
- A47J 31/46 (2006.01)

(52) U.S. Cl.
CPC ............. *A47J 31/46* (2013.01); *A47J 31/4485* (2013.01); *A47J 31/4489* (2013.01)

(58) Field of Classification Search
CPC ... A47J 31/4485; A47J 31/4489; A47J 31/46
USPC .......... 99/293, 323.1, 290, 291, 302 R, 305, 99/306, 307, 309, 323, 323.2, 232.3; 126/369.1, 374.1; 222/129.3, 129.4, 222/133, 190, 2, 245, 108; 137/398, 412
See application file for complete search history.

(56) References Cited

U.S. PATENT DOCUMENTS

| | | | |
|---|---|---|---|
| 4,800,805 A * | 1/1989 | Mahlich | A47J 31/4489 261/121.1 |
| 4,852,474 A * | 8/1989 | Mahlich | A47J 31/4489 261/121.1 |

(Continued)

FOREIGN PATENT DOCUMENTS

| | | | | |
|---|---|---|---|---|
| DE | 4445436 A1 * | 6/1996 | | B01F 3/04 |
| DE | EP 1949829 A1 * | 7/2008 | | |

(Continued)

OTHER PUBLICATIONS

DE4445436_A1_translation.pdf.*

(Continued)

*Primary Examiner* — Dana Ross
*Assistant Examiner* — Ket D Dang
(74) *Attorney, Agent, or Firm* — Brooks Kushman P.C.

(57) ABSTRACT

An apparatus for heating and frothing a beverage product, in particular milk, comprises a steam generator, a compressed air source, an air supply conduit connected to the compressed air source to supply air from the compressed air source to the steam generator, and a steam/air conduit connected to the steam generator to supply a steam/air mixture from the steam generator into the beverage product.

25 Claims, 5 Drawing Sheets

(56) References Cited

U.S. PATENT DOCUMENTS

| | | | | |
|---|---|---|---|---|
| 5,083,504 | A | * | 1/1992 | Koga .................. A47J 31/32 99/295 |
| 5,207,148 | A | * | 5/1993 | Anderson et al. ............. 99/281 |
| 5,335,588 | A | | 8/1994 | Mahlich |
| 5,464,574 | A | * | 11/1995 | Mahlich ............. A47J 31/4489 261/124 |
| 5,505,975 | A | * | 4/1996 | Taylor ................. A23L 1/0135 426/510 |
| 5,769,135 | A | * | 6/1998 | Mahlich ............. A47J 31/4489 141/70 |
| 5,937,738 | A | * | 8/1999 | Okamura ............... A47J 31/32 99/287 |
| 6,006,654 | A | * | 12/1999 | Pugh .............................. 99/293 |
| 6,080,435 | A | * | 6/2000 | Rubow .................. A23L 3/005 312/31.01 |
| 6,644,177 | B1 | | 11/2003 | Hsu |
| 6,713,110 | B2 | * | 3/2004 | Imboden et al. ............. 426/511 |
| 6,901,848 | B2 | | 6/2005 | Beretta |
| 7,021,206 | B2 | * | 4/2006 | Eckenhausen ...... A47J 31/4485 261/66 |
| 8,003,148 | B2 | | 8/2011 | Schoedler |
| 8,367,133 | B2 | | 2/2013 | Keller |
| 2005/0005780 | A1 | * | 1/2005 | Beretta ........................... 99/453 |
| 2008/0245239 | A1 | * | 10/2008 | Fischer .................. A47J 43/12 99/323.3 |
| 2009/0011110 | A1 | | 1/2009 | Gotlenboth |
| 2009/0047402 | A1 | * | 2/2009 | Schodler ....................... 426/474 |
| 2009/0095163 | A1 | * | 4/2009 | Sala et al. ....................... 99/284 |
| 2010/0011968 | A1 | * | 1/2010 | Fin ..................... A47J 31/4485 99/323.1 |
| 2010/0236416 | A1 | * | 9/2010 | Bonsch et al. .................. 99/280 |
| 2010/0323074 | A1 | * | 12/2010 | Fliegauf et al. .............. 426/474 |
| 2011/0070349 | A1 | * | 3/2011 | Burri .................. A47J 31/4485 426/474 |

FOREIGN PATENT DOCUMENTS

| | | |
|---|---|---|
| DE | 102009025986 A1 | 3/2011 |
| EP | 1501398 B1 | 2/2005 |
| EP | 1501398 B1 | 9/2006 |
| EP | 1747743 A1 | 1/2007 |
| EP | 2025270 A2 | 2/2009 |
| EP | 2036471 A1 | 3/2009 |
| EP | 2359725 A1 | 8/2011 |
| JP | 8-112204 A | 5/1996 |
| JP | 9-50578 A | 2/1997 |
| JP | 2005-524430 A | 8/2005 |
| JP | 2007-98227 A | 4/2007 |
| JP | 2009-45463 A | 3/2009 |
| JP | 2010-508927 A | 3/2010 |
| WO | 2004089173 A2 | 10/2004 |

OTHER PUBLICATIONS

European Search Report Dated Oct. 9, 2012, Applicant Wuf Wuerttembergische Mettalwarenfabrik AG, Application No. 12171356.4-2313, 6 Pages.

Official Communication Dated Feb. 16, 2012, Application No. 10 2011 077 776.8, Applicant WMF Wuertembergische Metallwarenfabrik AG, 4 pages.

Japanese Office Action Dated Feb. 2, 2016, Application No. 2012-133354, 4 Pages

* cited by examiner

APPARATUS FOR HEATING AND FROTHING A BEVERAGE PRODUCT

CROSS-REFERENCE TO RELATED APPLICATIONS

This application claims foreign priority benefits under 35 U.S.C. §119(a)-(d) to German patent application number DE 10 2011 077 776.8, filed Jun. 17, 2011, which is incorporated by reference in its entirety.

TECHNICAL FIELD

The disclosure relates to an apparatus for heating and frothing a beverage product, e.g., milk, in particular for the preparation of cappuccino, latte macchiato or similar hot drinks.

BACKGROUND

An apparatus for frothing milk is known, for example, from EP 1 501 398. In the apparatus described there the open end of a so-called conveyor pipe is submerged in a vessel containing milk. A steam generator is connected to the conveyor pipe by a first pipe, and a compressed air source is connected to the conveyor pipe by a second pipe. Both pipes are brought together and then lead to the conveyor pipe, so that a steam/air mixture is conducted through the conveyor pipe into the milk contained in the vessel.

A frothing apparatus for the frothing of milk is also known from DE 44 45 436. In this frothing apparatus steam is conducted from a steam generator through a steam supply conduit, milk is conducted through a milk supply conduit and air is conducted through an air supply conduit into a mixing chamber where they are mixed, and are subsequently pressed into a frothing chamber where the milk is frothed.

Other frothing apparatus are known, for example, from DE 10 2009 025 986, EP 2 025 270, EP 1 747 743 or WO 2004/089173.

The frothing apparatuses known in the prior art have the drawback that the injection of cold air into the steam conduit and the mixing chamber leads to a higher condensation of the steam and, thus, to a deterioration of the frothing process.

SUMMARY

The present disclosure is, therefore, based on the object to provide an apparatus for heating and frothing a beverage product, which allows an improved frothing process and supplies an improved foam.

According to the disclosure an apparatus for heating and frothing a beverage product is provided, comprising:
a steam generator,
a compressed air source,
an air supply conduit connected to the compressed air source to supply air from the compressed air source to the steam generator,
a steam/air conduit connected to the steam generator to supply a steam/air mixture from the steam generator into the beverage product.

Due to the fact that the compressed air is, unlike the prior art, conducted from the compressed air source into the steam generator, a heated steam/air mixture is already provided in the steam generator, which leads to a reduced condensation of water in a downstream steam conduit. This results in a better frothing result and better foam (froth).

The beverage product may be a milk-containing beverage product, specifically milk.

The air supply conduit may be connected to the compressed air source, in particular directly. It may be connected to the steam generator (indirectly or directly). Specifically, a fluidic connection may be provided in each case. If the connection is a direct one, the conduit opens into the compressed air source and the steam generator, respectively.

The steam generator may be adapted for the evaporation of hot water and may comprise a hot water area and a steam area. The air supply conduit may here be connected to the steam area and/or the hot water area. Specifically, the air supply conduit may open into the steam area and/or hot water area. The air supply conduit may also be connected to or open into a hot water withdrawal opening or a hot water withdrawal conduit of the steam generator. Such hot water withdrawal openings and conduits are used, for example, to withdraw hot water for cleaning procedures and/or for the preparation of tea or other hot water beverages. The aforementioned alternatives result in a very fine intermixing of air and steam.

Specifically, the steam generator may be a steam boiler.

The apparatus described (frothing apparatus) may comprise a water conduit which is connected to the steam generator to supply water to the steam generator, with the air supply conduit opening into the water conduit. By supplying the air into the water, from which the steam is generated subsequently, yet upstream of the steam generator, the disadvantageous effect of pressure fluctuations during the compressed air supply, e.g., caused by the air pump, is reduced.

The water conduit may be a cold water supply conduit for the supply of cold water. Specifically, this cold water supply conduit may be connected to the steam generator directly. In this way, the air would then be supplied to the steam generator together with the cold water. Alternatively, this cold water supply conduit may also open into a boiler or hot water apparatus, from which hot water is then supplied through a hot water conduit to the steam generator. If the compressed air is supplied to such a cold water conduit, it would then flow via the boiler to the steam generator. Alternatively, the aforementioned water conduit may also be a hot water supply conduit for the supply of hot water, which may run, for example, from a boiler to the steam generator. In this case it is also possible, that the air supply conduit opens into the hot water supply conduit.

The water conduit may be connected to a water source (directly or indirectly). The water source may be a water connection, e.g., via a water tap, or a water reservoir, e.g., in the form of a water container. The water source may be a cold water source and/or a hot water source.

The apparatus described may include an air shut-off member on the air conduit and/or a steam shut-off member on the steam/air conduit. The air flow or the flow of the steam/air mixture can be controlled or regulated by opening and closing these shut-off members. The shut-off members may in particular be shut-off valves. The shut-off members may be remote-controlled. The shut-off members may be actuatable electromagnetically, electrically, pneumatically and/or hydraulically.

The apparatus described may comprise a frothing chamber for frothing the beverage product, in particular milk, wherein the steam/air conduit is connected to the frothing chamber. The steam/air conduit may be connected to the frothing chamber directly or indirectly. Specifically, it may open into the frothing chamber. In such a frothing chamber steam, air and beverage product are mixed particularly thoroughly and emulsified, resulting in a particularly good foam consistency.

The apparatus may comprise a beverage product supply conduit, which is connected to the frothing chamber to supply the beverage product to the frothing chamber. The beverage product supply conduit can be connected to the frothing chamber indirectly or directly. Therefore, if milk is used, the supply conduit would be a milk supply conduit.

The apparatus described above may comprise a beverage product conveyor. Specifically, the beverage product conveyor may be adapted to convey milk, in particular cold milk. The beverage product conveyor may be adapted to convey the beverage product into the frothing chamber. Alternatively, or additionally, the beverage product conveyor may be adapted to convey a heated beverage product and/or a beverage product foam. The beverage product conveyor may be adapted to convey a beverage product from the same vessel into which the foam and/or the heated beverage product are dispensed. Alternatively, the beverage product conveyor may be adapted to convey a beverage product from another vessel than the one into which the beverage product foam and/or the heated beverage product are dispensed.

The aforementioned beverage product supply conduit may be connected to the beverage product conveyor, specifically open into the latter.

Specifically, the beverage product conveyor may comprise a Venturi chamber for sucking in the beverage product. In this way, a cold beverage product, a hot beverage product or beverage product foam may be sucked in and thus conveyed by means of the Venturi effect. Specifically, the Venturi chamber may be connected (indirectly or directly) to the steam/air conduit. The negative pressure for the Venturi effect can be generated by the steam/air flow. Alternatively, the beverage product conveyor may comprise a pump.

The above-described apparatus may further comprise a supply device which has one open end. The open end may be immersed in a vessel. Specifically, the open end may be immersed in a vessel containing a beverage product. The supply device may be adapted to supply a steam/air mixture, a heated beverage product and/or beverage product foam to the vessel. Supplying a steam/air mixture allows the frothing of a beverage product in the vessel. If a heated beverage product and/or beverage product foam are supplied, the supply device can be connected (indirectly or directly), for example, to a frothing chamber, in particular the outlet thereof, so as to supply the foam produced in the frothing chamber and/or the heated beverage product to the vessel.

The supply device may be connected to the steam/air conduit to dispense a steam/air mixture, a hot beverage product and/or beverage product foam from the open end. Preferably, the supply device can be connected directly to the steam/air conduit in order to dispense a steam/air mixture.

The frothing chamber may comprise a foam outlet opening or a foam outlet conduit for dispensing beverage product foam, in particular milk foam, into a vessel. The beverage product conduit and/or the beverage product conveyor may be adapted to conduct and convey a beverage product or beverage product foam from the vessel into the frothing chamber. An improved foam consistency may be obtained if the already dispensed beverage product or already dispensed beverage product foam are frothed again or repeatedly.

The supply device may comprise an inlet opening for receiving a beverage product. Specifically, the supply device can comprise an inlet opening for receiving a beverage product from the vessel. The supply device may comprise a beverage product supply conduit, e.g., as described above. Alternatively, or additionally, a beverage product supply conduit or the beverage product supply conduit may open into the inlet opening. The supply device may comprise a frothing chamber and/or a beverage product conveyor for conveying a beverage product. If the supply device comprises a frothing chamber, the beverage product would be frothed in the supply device. A frothing chamber provided in this manner may be connected to a beverage product supply conduit and/or a beverage product conveyor, as was already described above. The supply device can comprise, for example, a beverage product inlet opening which is connected to the frothing chamber by a beverage product supply conduit. The beverage product inlet opening and/or the frothing chamber may be arranged on or in the supply device in such a way that they can be immersed in the beverage product contained in the vessel.

Specifically, the beverage product conveyor provided in or on the supply device may comprise a Venturi chamber for sucking in the beverage product.

The above-described apparatus may comprise a temperature detection device for detecting the temperature of the heated beverage product and/or the beverage product foam. The temperature detection device may comprise a temperature sensor which is connected to and/or arranged on the beverage product supply conduit, the open end of the supply device, the inlet opening of the supply device, the beverage product conveyor and/or the frothing chamber, depending specifically on which of these members is present. Thus, for example, the beverage product temperature can be detected on or in the beverage product supply conduit, at or in the open end of the supply device, at or in the inlet opening of the supply device, in the beverage product conveyor, and in the frothing chamber, respectively. The temperature sensor may be adapted to detect the (beverage product and/or foam) temperature in the beverage product supply conduit, the frothing chamber, the beverage product conveyor and/or the vessel.

Specifically, the vessel may be the vessel containing, for example, a beverage product, in which the open end of the supply device is immersed.

Also, the temperature detection device may comprise several temperature sensors, which are each arranged on one of the aforementioned devices or elements.

The above-described apparatus may comprise a control device for the automated control and/or regulation of the steam generator, the compressed air source, the air shutoff member, the steam shut-off member and/or the beverage product conveyor. If, for example, a remotely controllable air shut-off member and/or steam shut-off member are provided, these members can be remote-controlled by the control device. The control device may be connected to the temperature detection device, in particular to one or more temperature sensors of the temperature detection device, and adapted to control and/or regulate in response to the detected temperature.

The control device may be adapted to predefine a desired beverage product temperature, foam temperature and/or foam consistency and allow the controlling and/or regulating in response to the predefined beverage product temperature, foam temperature and/or foam consistency. Specifically, a specific controlling of the steam generator, the compressed air source, the air shut-off member, the steam shut-off member and/or the beverage product conveyor may be programmed in the control device for a plurality of predefinable beverage product temperatures, foam temperatures and/or foam consistencies. In this way, for example, a user is able to input a desired foam temperature and/or foam consistency, whereupon the necessary devices and/or members are automatically controlled.

In the above-described apparatus the air shut-off member and/or the steam shut-off member may be controllable by the control device separately from each other. This allows the production of foam at a plurality of different temperatures and with different foam consistencies.

The above-described apparatus may comprise a cold beverage product container, in particular a cold milk container, and a cooling device for the cold beverage product container.

The apparatus described may comprise a pressure sensor for detecting the pressure in the steam generator and/or a temperature sensor for detecting the temperature in the steam generator, with the compressed air source and/or the air shut-off member being controlled in response to the detected pressure and/or the detected temperature. In this way it is possible to adapt the compressed air supply to the conditions in the steam generator, which results in a stable and uniform steam generation.

The disclosure further provides for a coffee machine, comprising one of the above-described apparatuses for heating and frothing a beverage product, in particular milk.

Exemplary embodiments of the disclosure will be explained in more detail with reference to the below drawings.

DETAILED DESCRIPTION

The figures show several embodiments. Other combinations of the different aspects shown in the figures and/or described below are possible as well.

Figure 1:
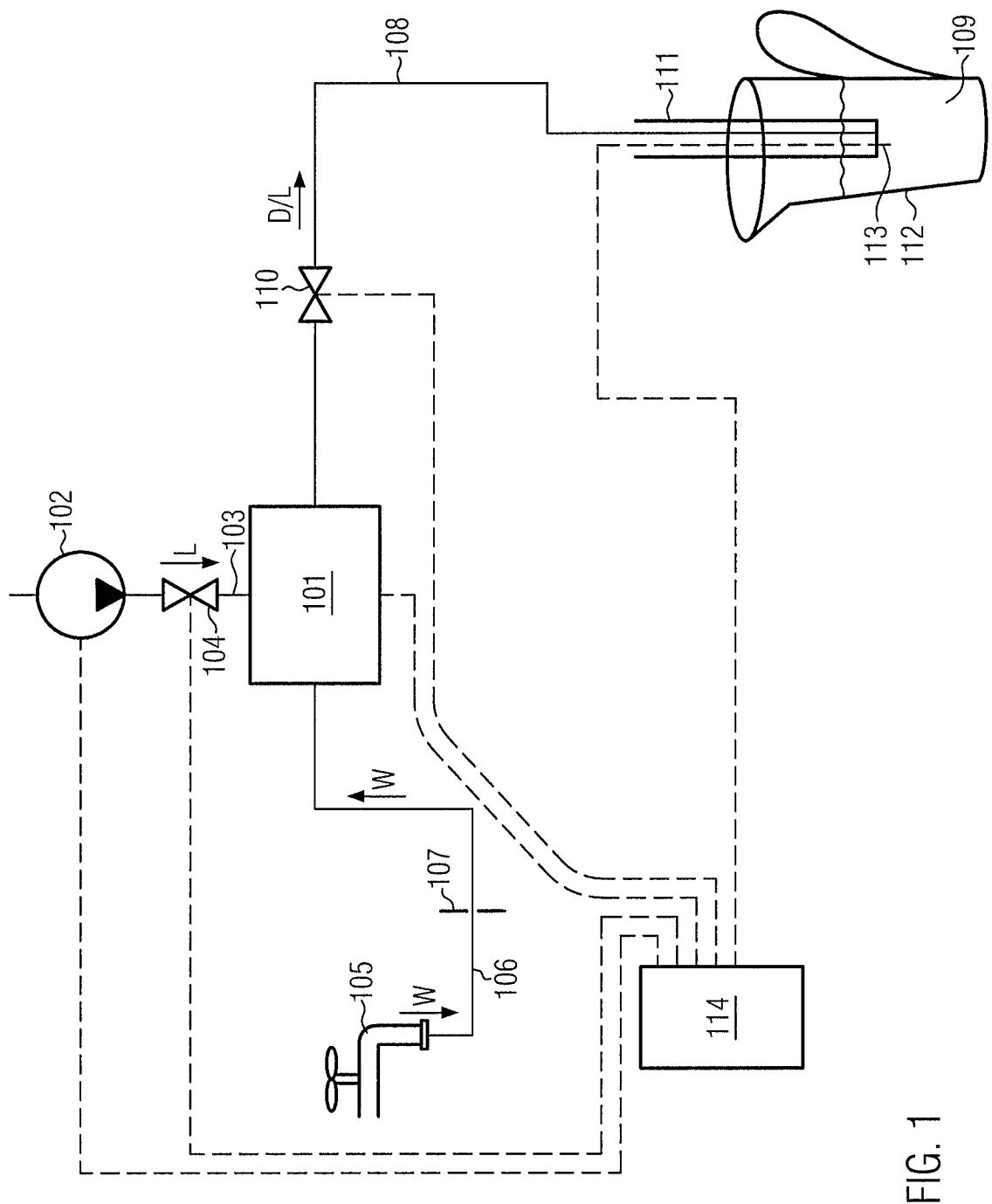
FIG. 1 schematically shows a representation of a first embodiment of an apparatus for heating and frothing milk.

The embodiment of an apparatus for heating and frothing milk as schematically shown in FIG. 1 comprises a steam generator 101. The steam generator can be, for example, a steam boiler in which water is evaporated. In this example and the following examples the beverage product to be frothed is milk. The use of other beverage products is possible as well.

The frothing apparatus further comprises a compressed air source 102. The compressed air source can be, for example, a compressed air pump or a compressed gas cartridge. An air supply conduit 103 leads from the compressed air source 102 to the steam generator so as to conduct compressed air from the compressed air source into the steam generator. In this example, a shut-off member in the form of a valve 104 is provided along the air supply conduit 103, which allows the regulation of the air supply to the steam generator. Specifically, the shut-off member may be closed to interrupt the air supply. The valve can be, for example, a solenoid valve or check valve.

The steam generator 101 is supplied by a water source 105 which, in the example shown, is provided in the form of a water tap. The water source 105 is directly connected to the steam generator by a water conduit 106. An orifice plate or a pressure reducer 107 for appropriately adjusting the water pressure may be provided along the water conduit 106. Also, a valve may be provided along the water conduit for controlling and/or regulating the water flow.

Instead of connecting the water conduit to the available water network by a water tap 105, also a water reservoir, e.g., in the form of a water container, for example the coffee machine, may be provided, from which the water is then conveyed by a corresponding conveyor into the steam generator. The water conveyance from the container into the steam generator can, in this case, be accomplished by means of gravitational force or by means of an active conveyance, e.g., by a pump.

In the example shown, a steam generator 101 is supplied with cold water, which is then heated and evaporated in the steam generator. Alternatively, a hot water boiler may be connected upstream of the steam generator, that is, the hot water boiler would then be connected between the water source 105 and the steam generator 101. In this case, the hot water boiler would be supplied with cold water from a cold water source through a cold water supply conduit. The cold water would be heated in the hot water boiler and supplied through a hot water supply conduit to the steam generator, where it evaporates.

Due to the fact that the compressed air is passed into the steam generator (e.g., into the hot water area or steam area thereof), and is not blown into a steam conduit branching off from the steam generator (or into a mixing chamber connected downstream of the steam generator for mixing air and steam) first, a homogeneous steam/air mixture is already generated in the steam generator. This steam/air mixture is conducted through a steam/air conduit 108 away from the steam generator and to the milk 109 to be frothed. A check valve 110 may be provided along the steam/air conduit for controlling and/or regulating the flow of the steam/air mixture.

The steam/air conduit 108 is directly connected to a supply device 111. The supply device includes (at the lower end thereof) one open end which may be immersed in a vessel 112 containing milk 109. The supply device can be formed, for example, as a pipe, with a steam/air channel running therein and opening into the open end and, thus, into the milk. The air supply conduit 108 is then connected (fluidically) to the steam/air channel of the supply device 111. In the described example it is, thus, possible to dispense the steam/air mixture through the open end into the milk 109 provided in the vessel 112, so that the milk is then heated and frothed in the vessel.

Although conventional air pumps provide the air discontinuously owing to their construction-related pulsation, i.e., more or less in blasts, a homogeneous mixture of air and steam can nonetheless be guaranteed because the air is already provided in the steam generator, which brings about a homogeneous foam.

Moreover, a temperature detection device is provided in the example shown, comprising a temperature sensor 113 which is connected to and arranged on the supply device in the region of the open end, i.e., in the lower region of the supply device 111. The temperature sensor 113 allows the detection or measurement of the temperature of the milk 109

(and, in the course of the operation, also of the milk foam) provided in the vessel 112. If the supply device 111 is designed, for example, in the form of a pipe the temperature sensor may also be arranged to be partially located in the pipe, with at least a portion of the temperature sensor, e.g., the tip, projecting out of the supply device.

The frothing apparatus described further comprises a control device 114 for the automated control and/or regulation of different parts or of the frothing apparatus as a whole. In the example shown, the control device is in particular connected to the steam generator 101, the compressed air source 102, the valves 104 and 110 as well as the temperature sensor 113. The control device 114 may further also be connected to the water source 105 or a valve arranged along the water conduit 106.

The compressed air valve 104 and/or the steam/air valve 110 can be remote-controlled by the control device 114 and can be opened or closed according to requirements.

Basically, a user is capable of inputting a desired milk or foam temperature in the frothing apparatus. Similarly, a desired foam consistency may be inputted. There can be, for example, different degrees of consistency for the foam among which the user can choose. Alternatively, it is also possible that the frothing apparatus and the control device are set up and programmed for a predefined foam temperature and/or a predefined foam consistency. To obtain a predefined or user-selected foam consistency the control device 114 may be programmed with respect to the necessary quantities of air and/or steam. During the frothing process the compressed air source 102 and/or the valve 104 would then be controlled to make the compressed air quantity required for the foam consistency available. The steam generator 101 and/or the valve 110 can be controlled by means of the control device 114 on the basis of the information provided by the temperature sensor 113. Thus, for example, valve 110 can be closed at a predetermined temperature below the foam temperature desired by the user. Also, it is possible to close the valve 110 exactly when the temperature sensor 113 measures the desired foam temperature.

For controlling the valves 104 and 110 as well as the steam generator 101 itself (in particular a heating element contained in the steam generator) a temperature sensor and/or pressure sensor may also be provided in the steam generator 101. By using Dalton's law (law of partial pressures) it is possible to detect from the pressure and the temperature in the steam generator the partial pressure of the introduced compressed air. On this basis the control device 114 can induce the valve 104 to be opened or closed so as to make the air quantity necessary for a desired foam consistency available.

Figure 2:
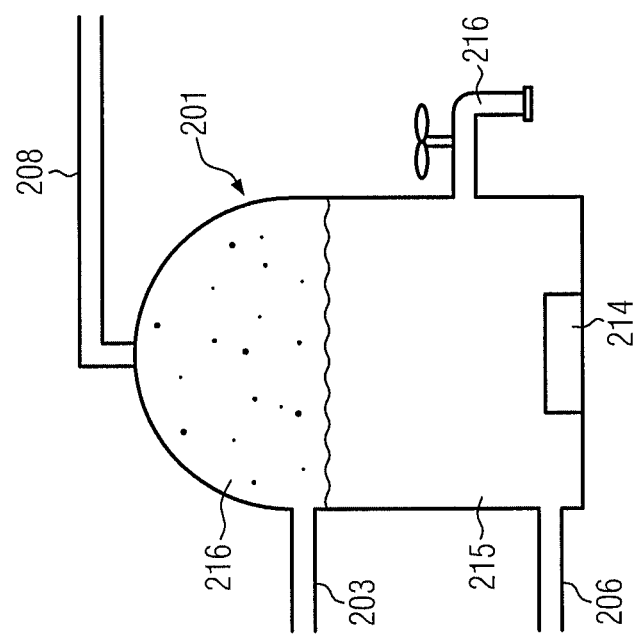
FIG. 2 schematically shows a cross-sectional view of the lower part of a supply device.

FIG. 2 schematically illustrates an example of a steam generator 201 in the form of a steam boiler. The steam boiler shown is a hot water boiler. In the steam generator 201 a heating element 214 is provided, by means of which the supplied water is heated and evaporated. The water is supplied through a water conduit 206, which may be a cold water supply conduit or a hot water supply conduit. The water heated by the heating element 214 for the evaporation is located in a lower region of the steam boiler, the so-called hot water area 215. Steam 216 is formed on top of the liquid. Thus, the steam is located in the steam area of the steam generator.

In the example shown, compressed air is conducted through an air supply conduit 203 into the steam area of the steam generator, i.e., into the steam. Thus, the air is finely intermixed with the steam in the steam area and uniformly distributed. Due to the hot steam the introduced air is simultaneously sterilized. The steam/air mixture is then conducted through a steam/air conduit 208 away from the steam generator towards the milk, e.g., to a supply device.

In the example shown, the air supply conduit opens directly into the steam generator, in the steam area thereof. Alternatively, the air supply conduit may also open into the steam generator at another position. For example, the air supply conduit can open into the hot water area 215. According to another example, a hot water withdrawal conduit 216 is provided on the steam generator. The withdrawn hot water can be used, for example, for cleaning purposes, or for the preparation of other hot beverages, e.g., tea. In such a case, the air supply conduit may also be connected to the hot water withdrawal conduit 216, e.g., open into the latter. The air supply conduit can open into the hot water withdrawal opening.

When air is introduced, which is usually cooler than the hot water or hot steam, and in comparison with injecting the compressed air into a steam conduit branching off from the steam generator, the expansion of the air due to the temperature rise is compensated by the relatively great buffer volume in the steam generator. Further, the pressure of the supplied air can be adjusted to the water generator or steam generator in a better way, as the pressure in the steam generator is more stable than in a steam conduit, due to the greater volume.

Figure 3:
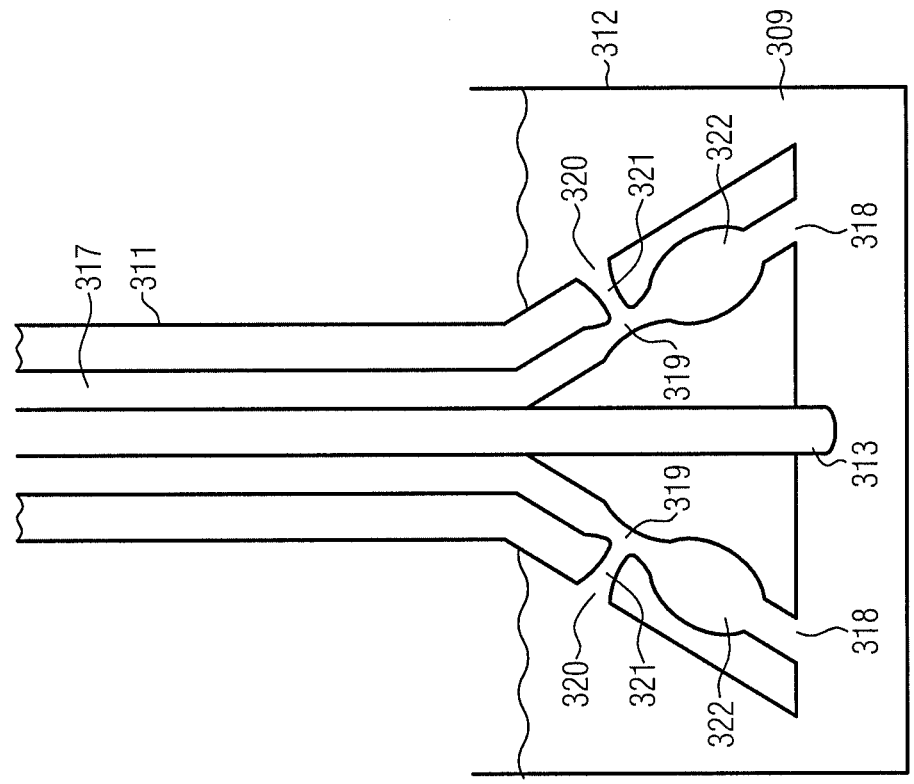
FIG. 3 schematically shows a representation of a second embodiment of an apparatus for heating and frothing milk.

For the supply device as shown, for example, also in FIG. 1, there are a plurality of possible exemplary embodiments. One example is schematically illustrated in FIG. 3. The supply device 311 shown in a cross-sectional view is designed in the form of a pipe in which a steam/air channel 317 is running. This steam/air channel 317 can be (fluidically) connected, for example directly, to a steam/air conduit coming from the steam generator. In the example shown, the supply device 311 includes two open ends 318 immersed in a vessel 312 containing milk 309. Moreover, a temperature sensor 313 is provided, which is arranged along the axis of the supply device 311, and around which the steam/air channel is provided.

In the example shown, the supply device comprises two Venturi chambers 319 and two frothing chambers 322 connected to the former. On the one hand, the Venturi chambers 319 are connected to the steam/air channel 317 and, on the other hand, to the respective frothing chambers. The flow of steam/air produces a negative pressure in each Venturi chamber 319, so that the milk 309 is sucked by means of the Venturi effect through the inlet openings 320 and the milk supply conduits 321 into the corresponding frothing chamber 322, where it is frothed and, again, dispensed into the vessel 312 through the open end 318. As the frothed milk is dispensed into the same vessel from which it had been sucked in, the milk may be repeatedly subjected to a frothing process in the Venturi chamber, which leads to an even better foam consistency.

In the alternative it is also possible to provide no Venturi chamber, but the milk supply conduits 321. The milk would then flow without an active conveyance into the frothing chambers, where frothing is performed inside the supply device.

Alternatively, instead of providing a frothing chamber, the steam/air channel 317 can also directly open into the open end 318 of the supply device 311, so that the steam/air mixture is dispensed from the supply device 311 directly into the milk 309 present in the vessel 312, and the frothing then takes place in the vessel and not in a frothing chamber provided in the supply device 311.

Figure 4:
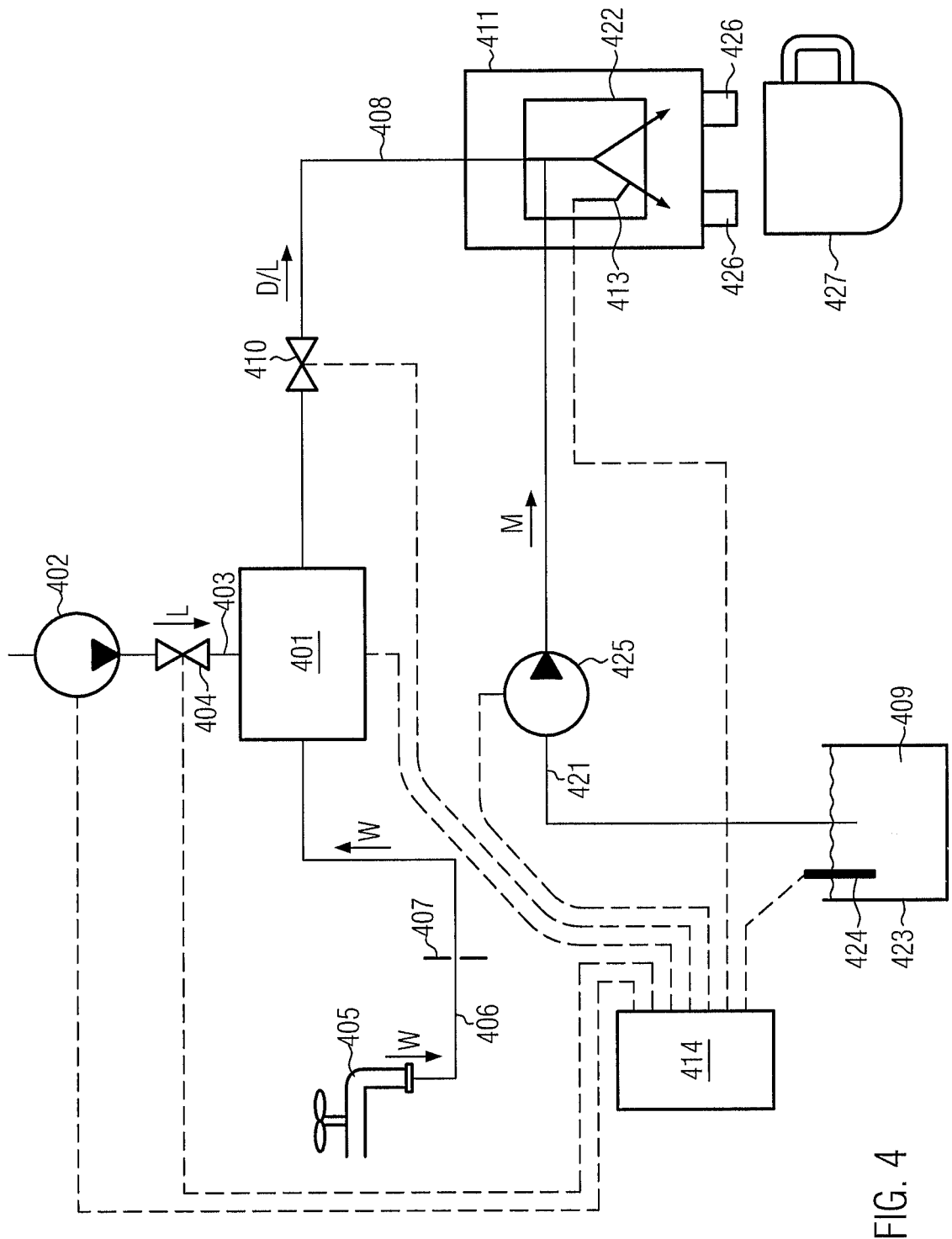
FIG. 4 schematically shows a representation of another embodiment of an apparatus for heating and frothing milk.

FIG. 4 schematically shows another embodiment of the frothing apparatus. The frothing apparatus illustrated in this example, too, comprises a steam generator 401 and a compressed air source 402, with the compressed air being supplied through an air supply conduit 403 to the steam generator. A valve 404 is provided along the air supply conduit 403. The air supply conduit 403 leads into the steam generator 401. As was already described in connection with FIG. 2, the air supply conduit 403 may open into the steam generator at different positions, e.g., in the steam area or in the hot water area. The cold water is conducted from a cold water source 405 through a water conduit 406, on which a pressure reducer 407 is arranged, into the steam generator. As was already described above, in this embodiment, too, a water container may be provided instead of the water tap, and/or a hot water area may be connected upstream of the steam generator 401.

From the steam generator 401 a steam/air conduit 408, on which a shut-off valve 410 is arranged, leads to a frothing chamber 422 in a supply device 411, where the milk is frothed.

In the example shown herein, the milk 409 is provided in a cold milk container 423. This cold milk container 423 can be arranged, for example, in a cooling device, e.g., a refrigerator. In order to monitor the milk temperature a temperature sensor 424 is provided, which is connected to the control device 414. Basically, the control device 414 of this example, too, can be connected to some or even all elements of the frothing apparatus which are capable of being controlled and/or regulated, as was already described above.

By means of a milk conveyor 425, e.g., a pump, the milk 409 is conveyed from the cold milk vessel through a milk supply conduit 421 into the supply device 411, and there into the frothing chamber 422. In the frothing chamber 422 the milk is mixed with and frothed by the steam/air mixture from the steam/air conduit 408, and is then dispensed through two open ends of the supply device 411 in the form of milk outlets 426.

A temperature sensor 413 is provided in the frothing chamber 422 to detect the temperature of the frothed milk. The different valves, the compressed air source and/or the steam generator may be controlled and/or regulated on the basis of the foam temperature and/or foam consistency predefined by a user, and the temperature measured by the temperature sensor 413.

Instead of the supply device 411 shown, a supply device as shown, for example, in FIG. 1 or 3 may be used as well.

Figure 5:
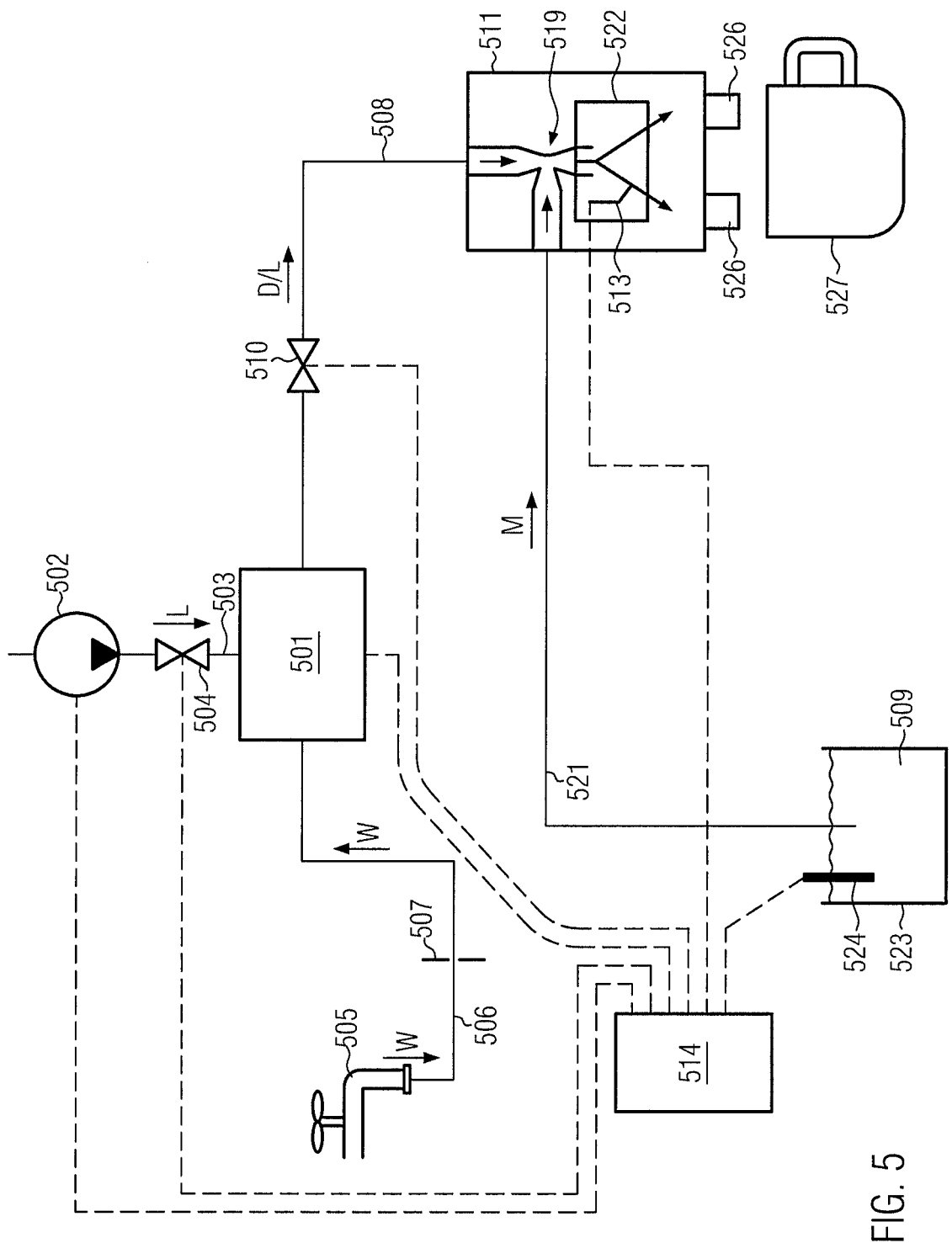
FIG. 5 schematically shows another embodiment of an apparatus for heating and frothing milk.

FIG. 5 schematically illustrates another exemplary embodiment of a frothing apparatus. The same elements as in FIG. 4 are designated with analogous reference numbers, whose first digit is increased by one, i.e., is a 5. For example, the steam generator is designated with 501 and the compressed air source with 502. The embodiment shown differs from the alternative of FIG. 4 in that the milk conveyance is not accomplished by a pump, but by a Venturi chamber 519 which is provided in the supply device 511 and, on the one hand, is connected to the steam/air conduit 508 and, on the other hand, to the frothing chamber 522. Due to the Venturi effect the steam/air flow produces a negative pressure in the Venturi chamber 519, so that the milk 509 is sucked from the cold milk container 523 through the milk supply conduit 521. Like in FIG. 4, the steam/air mixture is then frothed and emulsified with the milk in the frothing chamber. The milk is then dispensed as foam through two open ends 526 of the supply device 511 into a cup 527.

Figure 6:
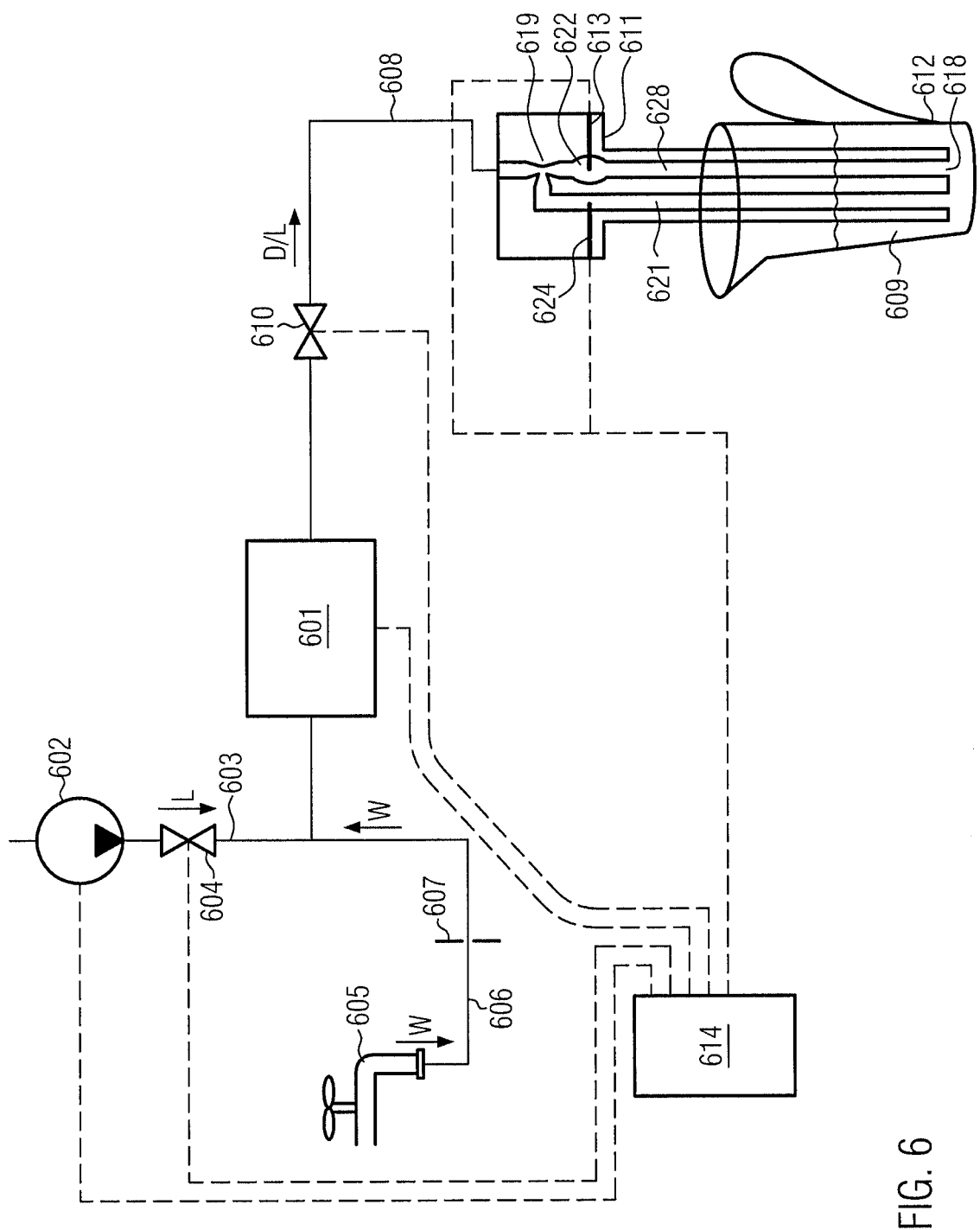
FIG. 6 schematically shows another embodiment of an apparatus for heating and frothing milk.

FIG. 6 schematically illustrates another exemplary embodiment, in which the elements already shown in the preceding figures are likewise designated with analogous reference numbers beginning with a 6. This exemplary embodiment differs from the preceding embodiments firstly in that the compressed air is not conducted into the steam generator 601, but into the cold water conduit 606. The compressed air source 602 is connected by an air supply conduit 603 to the cold water conduit 606 and opens into the latter. Thus, an air/water mixture is conducted from the opening point to the steam generator 601, where it is heated and where a steam/air mixture is thus generated.

In the example shown, cold water is supplied to the steam generator 601. As was already described above, a hot water boiler may be connected upstream of the steam generator. In this case the air supply conduit 603 may either open into the cold water supply conduit between the cold water source 605 and the hot water boiler, or into the hot water supply conduit between the hot water boiler and the steam generator. In both cases the steam generator is supplied with an air/water mixture.

Like, for example, in the embodiment according to FIG. 1, the milk 609 to be frothed is contained in a vessel 612. From this vessel 612 the milk 609 is conveyed through a milk supply conduit 621 into a frothing chamber 622. Like in the example of FIG. 5, the conveyor of this example is a Venturi chamber 619. The Venturi chamber 619 is thus connected to the steam/air conduit 608, the milk supply conduit 621 and the frothing chamber 622.

A foam channel 628 having an open end 618 leads from the frothing chamber again into the same vessel 612. The Venturi chamber 619, the frothing chamber 622, the milk supply conduit 621 as well as the foam channel 628 are provided as part of the supply device 611. Further provided are two temperature sensors 624 and 613 detecting the temperature of the milk to be frothed or frothed milk, respectively. Both temperature sensors are connected to the control device 614 so as to allow controlling and/or regulating the different elements of the frothing apparatus on the basis of one or both measured temperature values. Basically, it is also possible to provide only one of the two temperature sensors. In this embodiment, too, the milk may be frothed repeatedly, as the milk foam can be sucked once again through the milk conduit 621 into the frothing chamber.

It will be appreciated that the different elements and aspects of the embodiments shown and described can basically be combined with each other in an optional way. For example, the different supply devices as disclosed may be used in each one of the exemplary embodiments. The same applies to the different types of air supply, that is, the direct supply into the steam generator (into the steam area or hot water area thereof), or into a cold or hot water supply conduit to the steam generator. Also the different types of water supply (e.g., by a water tap or a water reservoir), either with or without an interposed hot water boiler, may be used in each embodiment. Basically, also the milk can be conveyed optionally in each embodiment. e.g., by means of a pump or the Venturi effect.

While exemplary embodiments are described above, it is not intended that these embodiments describe all possible forms of the disclosure. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for heating and frothing a beverage product, the apparatus comprising:
   a steam generator;
   a compressed air source;
   an air supply conduit connected to the compressed air source and leading from the compressed air source into the steam generator to supply air from the compressed air source to the steam generator; and
   a steam/air conduit connected directly to the steam generator at a location spaced away from the air supply conduit and configured to supply a steam/air mixture from the steam generator into the beverage product;
   wherein the steam generator is adapted for evaporation of hot water and comprises a hot water area and a steam area, and the air supply conduit is connected to the steam area or the hot water area such that air from the air supply conduit is combinable with steam in the steam generator at a location spaced away from the steam/air conduit.

2. The apparatus according to claim 1 wherein the air supply conduit is connected to the steam area and the hot water area.

3. The apparatus according to claim 1 further comprising a water conduit connected to the steam generator and configured to supply water to the steam generator or to discharge water from the steam generator, wherein the air supply conduit opens into the water conduit.

4. The apparatus according to claim 3 wherein the water conduit is a hot water supply conduit for supplying hot water, a hot water withdrawal conduit for discharging hot water, or a cold water supply conduit for supplying cold water.

5. The apparatus according to claim 3 wherein the water conduit is configured to supply water to the steam generator and to discharge water from the steam generator.

6. The apparatus according to claim 1 further comprising at least one of an air shut-off member on the air supply conduit or a steam shut-off member on the steam/air conduit.

7. The apparatus according to claim 6 further comprising a control device for automated control or regulation of at least one of the steam generator, the compressed air source, the air shutoff member or the steam shut-off member.

8. The apparatus according to claim 7 further comprising a temperature detection device for detecting temperature of at least one of heated beverage product or beverage product foam, wherein the control device is connected to the temperature detection device and is adapted to control or regulate in response to the detected temperature.

9. The apparatus according to claim 8 wherein at least one of a desired beverage product temperature, foam temperature or foam consistency is predefinable and the control device is configured to control or regulate in response to the at least one predefined beverage product temperature, foam temperature or foam consistency.

10. The apparatus according to claim 1 further comprising a frothing chamber for frothing the beverage product, wherein the steam/air conduit is connected to the frothing chamber and opens into the frothing chamber.

11. The apparatus according to claim 10 further comprising a beverage product supply conduit connected to the frothing chamber and configured to supply the beverage product to the frothing chamber.

12. The apparatus according to claim 10 further comprising a beverage product conveyor configured to convey the beverage product into the frothing chamber.

13. The apparatus according to claim 12 wherein the beverage product conveyor comprises a Venturi chamber for sucking in the beverage product, or a pump.

14. The apparatus according to claim 1 further comprising a supply device having an open end that is immersable in a vessel containing the beverage product.

15. The apparatus according to claim 14 wherein the supply device is adapted to supply at least one of the steam/air mixture, heated beverage product or beverage product foam to the vessel.

16. The apparatus according to claim 14 wherein the supply device is connected to the steam/air conduit to allow dispensing of at least one of the steam/air mixture, heated beverage product or beverage product foam from the open end.

17. The apparatus according to claim 14 wherein the supply device comprises an inlet opening for receiving the beverage product from the vessel.

18. The apparatus according to claim 14 wherein the supply device comprises at least one of a frothing chamber or a beverage product conveyor for conveying the beverage product.

19. The apparatus according to claim 1 further comprising a temperature detection device for detecting temperature of at least one of heated beverage product or beverage product foam.

20. The apparatus according to claim 19 further comprising a supply device having an inlet opening, an open end and a frothing chamber for frothing the beverage product, and a beverage product supply conduit that is connected to the inlet opening of the supply device for supplying the beverage product to the frothing chamber, wherein the temperature detection device comprises a temperature sensor that is connected to or arranged on the beverage product supply conduit, the open end of the supply device, the inlet opening of the supply device, or the frothing chamber.

21. The apparatus according to claim 20 wherein the temperature sensor is adapted to detect the temperature in at least one of the beverage product supply conduit or the frothing chamber.

22. The apparatus according to claim 1 further comprising a cold beverage product container and a cooling device for the cold beverage product container.

23. The apparatus according to claim 1 further comprising an air shut-off member on the air supply conduit, a control device for controlling at least one of the compressed air source or the air shut-off member, and at least one of a pressure sensor for detecting pressure in the steam generator or a temperature sensor for detecting temperature in the steam generator, wherein the control device is configured to control the at least one of the compressed air source or the air shut-off member in response to at least one of the detected pressure or the detected temperature.

24. The apparatus according to claim 1 further comprising a valve disposed in the steam/air conduit downstream of the steam generator.

25. A coffee machine comprising:
   a water reservoir for receiving water; and
   an apparatus according to claim 1, wherein the steam generator is connected to the water reservoir.

* * * * *